(12) United States Patent
LaFleur et al.

(10) Patent No.: US 7,768,602 B2
(45) Date of Patent: Aug. 3, 2010

(54) LIGHT DIFFUSING ARTICLE WITH GRIN LENSES

(75) Inventors: Edward E. LaFleur, Holland, PA (US); Edwin H. Nungesser, Horsham, PA (US); Jiun-Chen Wu, Shenzhen (CN); Didier Debier, Yens (CH)

(73) Assignee: Rohm and Haas Company, Philadelphia, PA (US)

( * ) Notice: Subject to any disclaimer, the term of this patent is extended or adjusted under 35 U.S.C. 154(b) by 199 days.

(21) Appl. No.: 12/286,156

(22) Filed: Sep. 29, 2008

(65) Prior Publication Data
US 2009/0097123 A1    Apr. 16, 2009

Related U.S. Application Data

(60) Provisional application No. 60/999,093, filed on Oct. 16, 2007.

(51) Int. Cl.
*G02F 1/1335*    (2006.01)

(52) U.S. Cl. .......................... 349/112; 349/64; 359/599

(58) Field of Classification Search .................... 349/64, 349/112, 118; 359/599
See application file for complete search history.

(56) References Cited

U.S. PATENT DOCUMENTS

| | | | |
|---|---|---|---|
| 5,442,482 A * | 8/1995 | Johnson et al. | 359/619 |
| 5,903,391 A | 5/1999 | Toshima et al. | |
| 6,771,336 B2 * | 8/2004 | Tatsuta et al. | 349/112 |
| 6,942,959 B2 * | 9/2005 | Dubin et al. | 430/321 |
| 7,072,115 B2 | 7/2006 | Uekita et al. | |
| 7,218,450 B2 | 5/2007 | Ahn et al. | |
| 7,379,246 B2 | 5/2008 | Kim et al. | |
| 7,453,635 B2 * | 11/2008 | Yeo et al. | 359/453 |
| 2007/0178295 A1 | 8/2007 | Haas | |
| 2007/0201246 A1 * | 8/2007 | Yeo et al. | 362/627 |

FOREIGN PATENT DOCUMENTS

| | | |
|---|---|---|
| EP | 0 294 122 A | 5/1988 |
| EP | 1944342 A1 | 7/2008 |

* cited by examiner

*Primary Examiner*—Mark Consilvio
(74) *Attorney, Agent, or Firm*—Stephen T. Falk

(57) ABSTRACT

A light diffusing article that has, on at least one surface, convergent lens particles or divergent lens particles.

17 Claims, No Drawings

LIGHT DIFFUSING ARTICLE WITH GRIN LENSES

This non-provisional application claims benefit under 35 U.S.C. §119(e) of U.S. provisional Application No. 60/999, 093 filed Oct. 16, 2007.

This invention is a light diffusing article that employ sheet like substrates, which article can be used in a variety of visual displays described below.

Light diffusing sheets are used in liquid crystal displays ("LCD") television screens, flat screen computer monitors and the like. They are used mainly to diffuse light sources that backlight a screen, for example, so that the light appears on the front of the screen to illuminate the screen fairly uniformly, rather than as a more concentrated source of light that might only brightly illuminate part of the screen, leaving other parts less well illuminated.

One of the common constituents of LCDs is optical films that diffuse incident light in the forward direction. The diffusion effect of these films is typically obtained through patterning or coating with polymeric particles. One example of these optical elements or devices is composed of a plastic sheet upon which is coated light scattering objects such as: spherical and amorphous glass particles, particles of titanium dioxide, transparent calcium carbonate particles, transparent polymer particles etc. The plastic sheet is further laminated on one side with a reflective surface, which directs the scattered light in the opposite and forward direction.

In juxtapose with the diffuser sheet is a sheet that is mechanically patterned to enhance the brightness of the light diffuser sheet. These devices form a necessary component of LCD displays.

The LCD display thus requires a structurally thin and robust light source of high uniform luminance. Incorporation of elaborate features that are designed to enhance the uniformity and luminous intensity of the planar light source defeats the very object of realizing a thin overall structure.

To improve the quality and simplify the complexity inherent to the numerous layers of optical films and sheets that comprise the light management portion of the display, two outstanding technological problems must be solved.

The first problem is to reduce in the number of layers in the display. This would only reduce the complexity of fabricating the display, and lower light attenuation due to photon absorption and scattering losses.

The second problem of equal importance is to reduce spherical and chromatic aberration. Spherical aberration occurs when a wide parallel beam of light is incident on the surface of a homogeneous lens. Because the rays that pass through a plain spherical lens are not all brought to the same focus, the image of the light source becomes distorted. With chromatic aberration, the parallel beam of white light incident on a plain convergent lens is decomposed into red rays and blue rays which are brought to different focal points. Thus, the plain spherical lens produces colored images of the white light source at slightly different positions.

The present invention solves both of these problems.

Examples of light diffusing approaches are described in U.S. Pat. Nos. 5,346,954 and 5,237,004.

The light diffusing article of the present invention comprises (a) an organic or inorganic polymeric sheet-like substrate that is optically clear with a refractive index of from 1.4 to 1.8; and (b) one or more layer of one or more coating composition on at least one surface of the substrate, wherein a given layer of coating composition comprises solid, clear polymeric lenses, and wherein the polymeric lenses in a given layer of coating composition are either:

(i) divergent lenses having a focal length of −0.5 µm to −15 µm, and a continuous refractive index gradient such that the refractive index at the centers of the lenses is lower than the refractive index at the surface of the lenses; or (ii) convergent lenses having a focal length of from 2.5 µm to 74 µm and a continuous refractive index gradient such that the refractive index at the centers of the lenses is greater than the refractive index at the surface of the lenses;

wherein each layer has a thickness of less than 375 µm, and wherein the polymeric lenses have a diameter of 0.85 to 30 µm. In one embodiment of the invention, the polymeric lenses in a given layer of coating composition of the light diffusing article have a polydispersity of 1 to 1.5; alternatively, the polymeric lenses in a given layer may have a polydispersity of greater than 1 and less than 1.5. Particle size may be measured by Brookhaven Instruments particle size analyzer BI-90 and polydispersity determined from the results of such measurements. The polydispersity of a system of particles is defined as the ratio of the weight average or volume average value of the particles to the number average value, determined by the instruments mentioned above. For all polydisperse systems this ratio is greater than one. The amount by which this ratio deviates from one is a measure of the polydispersity of the system of particles.

The light diffusing article may comprise two or more layers of coating compositions, wherein one or more layers of the coating composition are formed from divergent lenses, and one or more layers of the coating composition are formed from convergent lenses. In one embodiment of the invention, the light diffusing article may be formed such that the two or more layers of coating composition are on the same surface of the substrate; that is, the multiple layers are positioned or assembled on the same side of the substrate. In another embodiment of the invention, the light diffusing article may be formed such that two or more layers of coating composition are on opposing surfaces of the substrate; that is, one or more layer is positioned or assembled on one side of the substrate, and one or more layer is positioned on the opposing side of the substrate. In one embodiment of the invention in which the layers of coating composition are on opposing surfaces or sides of the substrate, one or more layer of coating composition formed from divergent lenses are on one surface of the substrate, and one or more layer of coating composition formed from convergent lenses are on the opposing surface of the substrate.

The light diffusing article may be formed such that the divergent lenses in any given layer of the one or more layer of coating composition formed from divergent lenses have essentially the same continuous refractive index gradient, and the convergent lenses in any given layer of the one or more layer of coating composition formed from convergent lenses have essentially the same continuous refractive index gradient.

In one embodiment of the invention, the article comprises one or more layer of the coating composition on one or more layers of substrate, in which at least one of the one or more layers of coating composition comprises a blend of divergent lenses and convergent lenses. The refractive index of the divergent lenses and convergent lenses for use in the blended layer(s) may be selected by a person of skill in the art to affect the desired optical properties of the resulting article.

The article, comprising one or more layer of substrate, may also be formed such that one or more portions of a given layer of substrate is coated with coating composition comprising divergent lenses or convergent lenses or a blend of divergent and convergent lenses while one or more other portions of the same given layer of substrate is uncoated, or coated with coating composition comprising divergent lenses, convergent lenses, or a blend of divergent and convergent lenses with different index of refraction or optical properties than the lenses in one or more other portions of the given layer of substrate.

In some embodiments of the invention, the light diffusing article may further comprise one or more layer of coating composition comprising solid, clear polymeric beads having a center and a surface, wherein the beads have a refractive index at the center which is essentially the same as the refractive index at the surface. These beads may be formed by conventional processes known in the art.

In one embodiment, the invention is a light diffusing article, comprising:

(a) an organic or inorganic polymeric sheet-like substrate that is optically clear with a refractive index of from 1.4 to 1.8;

(b) at least one first layer of a first coating composition on at least one surface of the substrate with the first coating composition comprises solid clear first polymeric divergent lenses from 0.85 to 30 µm in diameter, a focal length of –0.5 µm to –15 µm, and a continuous refractive index gradient such that the refractive index at the centers of the first lenses is lower than the refractive index at the surface of the first lenses and wherein the first layer is less than 20 µm thick; and (c) at least one second layer of a second coating composition on at least one surface of the substrate with the second coating composition comprises solid clear second polymeric convergent lenses lens from 0.85 to 30 µm in diameter, a focal length of from 2.5 µm to 74 µm and a continuous refractive index gradient such that the refractive index at the centers of the second lenses is equal to or higher than the refractive index at the surface of the second lenses and wherein the second layer is less than 20 µm thick.

The polymeric lenses of both the one or more first and second layers may have a particle size (diameter) of 0.85 to 30 µm. The particle size of the polymeric lenses may have lower limits of diameter size of 0.85, 1 or 1.25 µm, to upper limits of 30, 20 or 15 µm. All ranges are inclusive and combinable.

This invention reduces the loss of light and minimizes spherical and chromatic aberration. Because the refractive index of the gradient refractive index ("GRIN") spherical lens varies continuously within the lens media a unique focus is defined by light rays that transmit through the sphere. A consequent of this is the observation that light rays are bent with the change in refractive index. The bending of the light rays results in, the elimination of light loss through total internal reflection, and the creation of a well defined focal point and focal length, unique to the spherical lens geometry.

In one embodiment of this invention, at least one of the one or more layers is applied in an aqueous polymeric dispersion to said substrate. In another embodiment, the aqueous polymeric dispersion further includes a latex polymeric binder. Preferably, the first and second layers have thicknesses of from 6 µm to 150 µm.

Preferably, where the article comprises more than one layer of coating composition, there are one or more layers on different surfaces of the substrate, most preferably on opposing surfaces of the sheet-like substrate. Preferably the substrate has a haze lower than 10% and luminous transmittance greater than 90%.

This invention can be used in a variety of different applications including diffuser films or boards for LCD television sets or diffuser films for flat screen computer monitors, cell phone displays, laptop screens, video game and graphic displays, and camera screens As explained above, this invention includes an organic or inorganic polymeric sheet-like substrate that is optically clear with a refractive index of from 1.4 to 1.8. Suitable substrates comprise materials selected from acrylonitrile-butadiene-styrene ("ABS"), polyolefins, polycarbonates, polycarbonate-polyester blends, polyamides, poly(alkylene terephthalates), polystyrene, cyclo-olefins, polystyrene/methacrylate blends, and combinations thereof. In some embodiments of this invention, the substrate polymer is selected from polymethyl methacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride copolymers and combinations thereof. The substrates also include inorganic glasses.

The refractive indices of customary used plastics and glasses for this application vary from a minimum of: 1.4 for poly(vinylidene)fluoride to 1.8 for glass doped with thallium oxide ($Tl_2O$).

By "sheet-like" we mean that the substrate has a length or width (or both) that is substantially larger than its thickness. In one preferred embodiment, the substrate is flexible with a thickness of less than 3 mm. In other embodiments, the substrate can be rigid, e.g., made from a glass or glass-like material. The substrate can be rigid, dimensionally stable, free standing film or flexible thin film that requires a supporting frame or plane surface to lend mechanical stability. The substrate can also be multilayer and patterned on one or both sides.

The focal length of the lens is independent of the surrounding media. The focal length of the spherical lens is uniquely defined by the morphology of the lens, by morphology we refer to the change in refractive index; i.e. if the surface created by the variation of refractive index with radius is parabolic (convergent lens) or hyperbolic (divergent lens) with radius of the lens.

As explained above, this invention involves the use of convergent and divergent lens compositions. Divergent lens compositions can be made as taught in U.S. Pat. No. 5,346,954 which we incorporate by reference. In essence, divergent lens compositions have polymeric particles that have an index of refraction that decreases continuously from the surfaces of the polymer particles to the cores of the polymer particles that make up the divergent lens composition.

The focal length of a divergent lens is calculated in accordance with the following equation:

$$r_1 = (r_0 \mu_0)/(n_\alpha) \cdot \{\pi \cdot (\ln(\mu) \cdot (1-\ln(\mu)))^{1/2} - 1\}$$

where $r_1$ is the focal length, $r_0$ is the radius of the particle core, $\mu_0$ is the refractive index at the center of the particle as determined from the composition of the interior of the sphere, $n_\alpha$ is the refractive index at the position of $r_1$, $\mu$ is the refractive index at the center of the particle.

The refractive index, $n_\alpha$, is determined from the gradient of the radius of the sphere versus refractive index.

The focal point of a divergent sphere lens is located inside the lens. By convention the focal length of a divergent sphere lens is considered as the distance from the center of the sphere along the central axis to the point of convergence of the refracted rays. By convention this value is recorded as a negative value Convergent lens compositions can be made in two ways. In one way, as taught in Okada et al *Polymer Preprints, Japan* Vol. 43 No. 7 2410-2411 (1994) (which we incorporate by reference), the polymer particles that make up a convergent lens compositions have polymer particles that have an index of refraction that increases continuously from the surfaces of the polymer particles to the cores of the polymer particles that make up the convergent lens composition. A second way to make a convergent lens composition, as taught in U.S. Pat. No. 5,346,954 is to have no change in the index of refraction from the surfaces of the polymer particles to their cores. However, having a gradient in the index of refraction that increases continuously from the surfaces to the core is the preferred convergent lens composition.

The focal length of a convergent sphere lens is determined in accordance with Iga et al., *Distributed-index planar microlens and stacked planar optics: a review of progress*, Applied Optics Vol. 25, No. 19 pp 3388-3396 (Equation 13, at p. 3389). The focal point of a convergent sphere lens is located outside the lens. By convention, the focal length of a convergent lens is the distance from the center of the lens to the point of convergence of the rays that radiated out of the sphere. The value of the focal length for the convergent sphere lens is recorded as a positive value.

With either of convergent or divergent lens compositions, the variation in refractive index is measured by the Zeiss Jenaval interference microscope. This measuring technique, defined as the shearing interference method, is centered around the determination of the optical path difference. The path difference is understood to be the difference between two optical path lengths which are caused by differences in the refractive index and or thickness. The interference-microscopic path difference is the difference between the optical path length in an object and that in its surroundings. The optical path length S is the product from the distance d covered and the refractive index n of the medium passed through.

The divergent and convergent lens compositions can be made so as to be stable in organic solvents. As explained below in connection with the polymerization of such beads in aqueous media, the polymerization is multistage. To make beads that are stable in organic solvents, in Stage I for divergent sphere lens a crosslinker should be used and should include between 4 and 60% alternatively between 4 and 40%, of one or more of the following monomers: ethylene glycol diacrylate, propylene glycol diacrylate and tetramethylene glycol diacrylate. In stage II, the crosslinker, for divergent sphere lens, should include between 4 and 60%, alternatively between 4 and 20%, of one or more of the following crosslinker moieties: diethylene glycol bis(ally carbonate), allyl methacrylate, ethylene glycol dimethacrylate, propylene glycol dimethacrylate and tetramethylene glycol dimethacrylate.

For stability in organic solvents, Stage I crosslinker, for convergent sphere lens, should include between 4 and 60%, alternatively between 4 and 40%, of one or more of the following monomers: diethylene glycol bis(ally carbonate), allyl methacrylate, ethylene glycol dimethacrylate, propylene glycol dimethacrylate and tetramethylene glycol dimethacrylate. The Stage II crosslinker, for convergent sphere lens, should include between 4 and 60%, alternatively between 4 and 20%, of one or more of the following crosslinker moieties: ethylene glycol diacrylate, propylene glycol diacrylate and tetramethylene glycol diacrylate.

The use of crosslinked polymer lenses or beads is particularly beneficial when the beads will be processed in the presence of solvents. Crosslinked beads can be characterized as solvent-resistant, meaning that they are not destructured by exposure to solvent. Such solvent-resistant beads will not swell in the presence of solvent, and are not destructured, they remain unchanged in size when the solvent is no longer present. However, too much crosslinking can have negative effects, including shrinkage of the bead size, and decreased optical properties of the resulting beads.

The light diffusing article may comprise polymeric lenses or beads that are formed by a two stage process involving a first stage to form an inner portion of the polymeric lenses and a second stage to form an outer portion of the polymeric lenses. In one embodiment of the invention, crosslinker as described above may be used; in particular, crosslinker may be used in the second stage that forms the outer portion of the polymeric lenses. The use of crosslinker can form solvent-resistent beads that, therefore, be processed in the presence of solvents as may be commonly or usefully used in the manufacture of light diffusing articles.

In one embodiment of the invention, the polymeric lens may be prepared according to the description in Wu et al., U.S. Pat. No. 5,237,004. In Wu et al., the polymeric lenses, as are useful in the present invention, comprise spherical polymer particles comprising rubbery alkyl acrylate polymer, the alkyl group having from 2 to 8 carbon atoms, copolymerized with 0 to about 10%, preferably 0 to about 5%, crosslinker, 0 to about 10%, preferably 0 to about 5%, graftlinker and 0 to about 50% of copolymerizable vinyl monomer (based on the total weight of the particles) and optionally one or more polymer shells surrounding the rubbery alkyl acrylate polymer, the outermost of which is compatible with the matrix polymer, which shell(s) comprise 0 to about 40% of the weight of the particles plus shell(s). The spherical polymer particles may comprise only a single polymer phase, i.e., a single-phase polymer; or they may comprise a polymeric core phase, and one or more polymeric shell phase(s), i.e., a core/shell polymer.

In accordance with one aspect of the present invention the polymer composition is a light scattering composition based on a thermoplastic polymer matrix, the spherical polymer particles are present in an amount of from 0.1 to 10% of the total composition weight, the rubbery alkyl acrylate polymer having a refractive index within +/−0.2 units of, but preferably no closer than +/−0.003 units to, the refractive index of the matrix polymer.

One procedure for making the spherical polymer particles of the present invention is described and claimed in Ugelstad, U.S. Pat. No. 4,186,120.

When the polymer particles comprise only a single polymeric phase, the particles may be prepared from one or more vinyl monomers, and may be a rubbery or glassy polymer. The spherical polymer particles may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, such as methyl methacrylate, butyl methacrylate, phenyl methacrylate, ethyl acrylate, butyl acrylate, 2-ethylhexyl acrylate and benzyl acrylate; vinyl chloride; and other common monomers polymerizable by free-radical initiation.

The preferred particles are spherical polymer particles of rubbery alkyl acrylate polymer, the alkyl group having from 2 to 8 carbon atoms, copolymerized with from 0 to about 60% crosslinking monomer, preferably from 4 to 60% crosslinking monomer, and from 0 to about 50% other copolymerizable vinyl monomer. The preferred alkyl acrylate is butyl acrylate, and the preferred other copolymerizable vinyl monomer or monomers are more preferably monovinyl monomers, preferably selected from the group consisting of alkyl methacrylates and monovinyl arenes, and still more preferably styrene. Monovinyl arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The indicated percentages are by weight (as are all proportions used herein unless otherwise indicated), and are percentages of the total polymer-particle monomer. The alkyl acrylate and any copolymerizable vinyl monomer are selected such that the refractive index of the spherical polymer particle will be within about +/−0.2 units, preferably within about +/−0.1 units, more preferably within about +/−0.05 units, and still more preferably about +/−0.03, of the refractive index of the matrix polymer. However, as an exact match between the refractive indices of the spherical polymer particles and matrix polymer will produce an almost completely transparent composition, the refractive index of the spherical polymer particles is preferably no closer than about +/−0.003 refractive index units to that of the matrix polymer.

Crosslinking monomers suitable for use as the crosslinker in the spherical polymer particles are well known to those skilled in the art, and are generally monomers copolymerizable with the monounsaturated monomers present, and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. A second class of crosslinking monomer, often referred to as graftlinking monomers, are polyethylenically unsaturated monomers copolymerizable with the monounsaturated monomers present, and having two or more non-conjugated double bonds of differing reactivity, as for example allyl methacrylate, diallyl maleate and allyl acryloxypropionate. The preferred crosslinking monomer from this group is allyl methacrylate. Combinations of both types of crosslinking monomer maybe employed. If crosslinking monomer is employed, it is preferably used at levels from 4 to 60%, more preferably about 4 to about 40%, and most preferably from 4 to 20%, based on the total monomer weight.

Alternatively, the spherical polymer particle may be crosslinked using other techniques known to those skilled in the art, as for example by post-cure reactions. Such a post-cure reaction may be seen when a copolymer is formed from a monomer having a pendant peroxide group, which is then activated by heating to a temperature higher than that used in the polymerization. The activated peroxide group will promote crosslinking of the spherical polymer particle. In another example, a second free-radical initiator may be added to the polymerization; this second initiator is selected to be stable at the initial polymerization temperature, but to be activated by light or a higher temperature subsequent to the initial polymerization.

The spherical polymer particle may contain residual oligomeric material used in the polymerization process to swell the polymer particles but such oligomeric material has a high enough molecular weight to prevent its diffusion or being extracted during processing or use, and is present at such a low concentration that it has little or no effect upon mechanical properties of the spherical polymer particles or the light-scattering composition.

The spherical polymer particles useful in the present invention have a particle diameter from about 2 to about 15 μm, and a narrow particle size distribution within any particular polymer composition, preferably such that 90% by weight of the particles fall within +/−20% of the average particle diameter. If many particles much larger than the desired size are present in the light-scattering composition, the efficiency of diffusion is decreased and the polymer surface is less attractive, while if many undersized particles are present, backscattering increases and overall light transmission decreases. Such a narrow size distribution is readily obtained by emulsion polymerization techniques, but the particles themselves tend to be smaller than 1 μm. Particles at the upper end of the desired size range may be made by suspension polymerization techniques but the size distribution is unacceptably broad. Consequently, although other techniques for preparing particles having the particle size, size distribution and spherical configuration are useful in the present invention, the preferred technique for making them involves preparing uniformly sized small particles by emulsion polymerizing at least one monomer component of the spherical polymer particle to form emulsion polymer particles, swelling the emulsion polymer particles with one or more monomer components of the spherical polymer particle, and polymerizing the monomer within the emulsion polymer particles. The swelling and polymerizing steps may be repeated until the particles have grown to the desired size. A preferred procedure for making the spherical polymer particles involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight. As in the preferred process above, at least the final polymerization is carried out under conditions which do not so limit the polymer molecular weight.

The above process for growing larger particles from emulsion-sized particles retains much of the size uniformity of the original, emulsion particles, and is capable of increasing the size of the original, emulsion-polymerized polymer by a factor of at least 10 and as much as 1000. A small amount of very small emulsion particles may be observed in the product of these processes, but such particles account for much less than 0.1% of the total particle weight, and do not adversely affect the optical properties of the light-scattering polymer. Related techniques for preparing uniformly sized particles in the desired size range are taught by Ugelstad, U.S. Pat. No. 4,186,120.

When the polymer particles comprise a polymeric core phase and at least one polymeric shell phase, the core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomer polymerizable by free-radical initiation.

The shell or shells preferably comprise from about 5 to about 40% of the weight of the core/shell particles.

The preferred core/shell particles comprises individual particles with a diameter from about 2 to about 15 μm, preferably from about 5 to about 10 μm, and a narrow particle-size distribution. The particle size distribution is such that at least 90% by weight of the particles fall within +/−20% of the average diameter of the particles; it is understood that the term "particle size distribution" used herein refers to the size range of at least 90% by weight of the particles. The particles have a core of rubbery alkyl acrylate polymer, the alkyl group having from 2 to 8 carbon atoms, copolymerized with from 0 to about 60%, preferably from 4 to about 60%, crosslinking monomer, from 4 to about 40%, preferably from 0 to about 5%, graftlinking monomer, and from 0 to about 50% other copolymerizable vinyl monomer. The preferred alkyl acrylate is butyl acrylate, and the preferred other copolymerizable vinyl monomer or monomers are more preferably monovinyl monomers, preferably selected from the group consisting of alkyl methacrylates and monovinyl arenes, and still more preferably styrene. Monovinyl arenes, as used herein, include such monoethylenically unsaturated aromatic monomers as styrene, alkylstyrenes such as methylstyrene and ethylstyrene, other substituted vinylbenzenes wherein the substitutents do not interfere with polymerization, and similar vinyl polycyclic aromatic monomers. The indicated percentages are by weight (as are all proportions used herein unless otherwise indicated), and are percentages of the total core monomer. The alkyl acrylate and any copolymerizable vinyl monomer are selected such that the refractive index of the core polymer will be within about +/−0.2 units, more preferably within about +/−0.05 units, and still more preferably within about +/−0.03, of the refractive index of the matrix polymer. However, as an exact match between the refractive indices of the core polymer and matrix polymer will produce an almost completely transparent composition, the refractive index of the core polymer is preferably no closer than about +/−0.003 refractive index units to that of the matrix polymer.

Crosslinking monomers suitable for use as the crosslinker in the core polymer are well known to those skilled in the art, and are generally monomers copolymerizable with the other core monomers and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. If crosslinking monomer is employed, it is preferably used at levels of from about 0.4 to about 60%, more preferably 0.4 to about 40%, and still more preferably from about 10 to about 40%, based on the total core monomer weight. Graftlinking monomers suitable for use as the graftlinker in the core polymer are also well known, and generally are polyethylenically unsaturated monomers copolymerizable with the other core monomers and having sufficiently low reactivity of the unsaturated groups to allow significant residual unsaturation to remain in the core polymer subsequent to its polymerization, as for example allyl methacrylate, diallyl maleate, allyl acryloxypropionate and the like. The preferred graftlinking monomer is allyl methacrylate. If a graftlinking monomer is employed, it is preferably used at levels from about 0.1 to about 10% more preferably about 0.1 to about 5%, more preferably from about 0.5 to about 5%, and still more preferably from about 0.5 to about 2.5%, based on the total weight of the core monomers.

Alternatively, the core polymer may be crosslinked and the core polymer may be graftlinked to the shell polymer using other techniques known to those skilled in the art, as for example by post-cure reactions. Such a post-cure reaction may be seen when a copolymer is formed from a monomer having a pendant peroxide group, which is then activated by heating to a temperature higher than that used in the polymerization. The activated peroxide group will promote graftlinking and crosslinking of the core/shell polymer components. In another example, a second free-radical initiator may be added to the polymerization; this second initiator is selected to be stable at the initial polymerization temperature, but to be activated by light or a higher temperature subsequent to the initial polymerization.

The core polymer may contain residual oligomeric material used in the polymerization process to swell the polymer particles but such oligomeric material has a high enough molecular weight to prevent its diffusion or being extracted during processing or use, and is present at such a low concentration that it has little or no effect upon mechanical properties of the core, the core/shell polymer, or the light-scattering composition.

Surrounding the core of the particles are one or more shells of polymer, the outer shell being a polymer compatible with the matrix polymer, i.e., the polymer itself is capable of forming a homogeneous blend with the matrix polymer. For example, a shell of poly(methyl methacrylate) will be compatible with a matrix polymer of poly(methyl methacrylate), or poly(vinyl chloride). The shell polymer may be compatible with the matrix polymer as a result of chemical similarity, as in the above example of methyl methacrylate polymers for the shell and the matrix polymer, or it may be determined empirically to be compatible, as in a shell of styrene copolymerized with about 25 to about 30%, based on total shell monomer weight, of acrylonitrile; this shell is also compatible with a poly(methyl methacrylate) or a poly(N-methyl glutarimide) matrix polymer. Many such compatible polymer combinations for the shell and matrix polymers are known to those skilled in the art, and others may readily be determined by routine experimentation, as for example by preparing blends of proposed shell polymers and the matrix polymer and examining the blends for such evidence of compatibility as absence of haze, existence of a single glass transition temperature, and the like.

Crosslinking monomers suitable for use as the crosslinker in the shell polymer are well known to those skilled in the art, and are generally monomers copolymerizable with the other shell monomers and having polyethylenic unsaturation in which the ethylenically unsaturated groups have approximately equal reactivity, as for example divinylbenzene, glycol di- and trimethacrylates and acrylates, triol triacrylates and methacrylates and the like. The preferred crosslinking monomers are butylene glycol diacrylates. If crosslinking monomer is employed, it is preferably used at levels of from about 0.4 to about 60%, more preferably 0.4 to about 20%, and still more preferably from about 10 to about 20%, based on the total core monomer weight.

The shell polymers comprise from about 0.1 to about 40%, preferably from about 5 to about 40%, and more preferably from about 15 to about 35%, of the total particle weight.

The core/shell polymer particles useful in the present invention have a particle diameter from about 2 and about 15 μm, preferably from about 5 to about 10 μm, and a narrow particle size distribution within any particular polymer composition, preferably such that 90% by weight of the particles fall within +/−20% of the average particle diameter. If many particles much larger than the desired size are present in the light-scattering composition, the efficiency of diffusion is decreased and the polymer surface is less attractive, while if many undersized particles are present, backscattering increases and overall light transmission decreases. Such a narrow size distribution is readily obtained by emulsion polymerization techniques, but the particles themselves tend to be smaller than 1 μm. Particles at the upper end of the desired size range may be made by suspension polymerization techniques but the size distribution is unacceptably broad. Consequently, although other techniques for preparing particles having the particle size, size distribution and core-shell configuration are useful in the present invention, the preferred technique for making them involves preparing uniformly sized small particles by emulsion polymerizing at least one monomer component of the core polymer to form emulsion polymer particles, swelling the emulsion polymer particles with one or more monomer components of the core polymer, and polymerizing the monomer within the emulsion polymer particles. The swelling and polymerizing steps may be repeated until the particles have grown to the desired core size. A preferred procedure for making the core involves emulsion polymerizing the initial emulsion polymer particles using conditions which restrict the molecular weight of the polymer that forms, such as by including chain-transfer moderators, e.g., mercaptans, in the polymerization mixture, such that the resulting emulsion particles comprise an easily swellable oligomer. This process may be varied by preparing the initial emulsion polymer particles in the absence of such limiting of the polymer molecular weight, but subsequently conducting one or more of the swelling and polymerizing steps using the conditions which restrict the polymer molecular weight. In this variation the initial emulsion polymer particles do not swell as readily as subsequent, larger particles having a lower overall molecular weight. As in the preferred process above, at least the final polymerization is carried out under conditions which do not so limit the polymer molecular weight.

The process of preparing the particles of the present invention may include
A) selecting as a rubbery core polymer composition a copolymer of an alkyl acrylate, the alkyl group having from 2 to 8 carbon atoms and the copolymer having a refractive index within +/−0.05 units of, but no closer than about +/−0.003 units to, the refractive index of the matrix polymer,
B) polymerizing particles of core polymer, from a first aqueous emulsion of one or more of the monomers which, when polymerized, produce the selected core polymer,
C) performing one or more steps of
  1) swelling the particles of core polymer with one or more of the monomers, which, when polymerized, produce the selected core polymer, and
  2) polymerizing the swelling monomer within the particles of core polymer, until all of the monomers which lead to the selected core polymer have been polymerized in these particles, and the particles have reached a desired size within the range from about 2 to about 15 μm, and
D) performing one or more steps of
  1) suspending the core polymer particles in a second aqueous monomer emulsion, the monomers of which are polymerizable to form a polymer compatible with the matrix polymer, and
  2) polymerizing onto the polymer particles a polymer shell from the monomer in the second emulsion.

The shell or shells are polymerized onto the previously polymerized layers using conventional core/shell techniques such as those taught by Owens, U.S. Pat. No. 3,793,902.

The above process for growing larger particles from emulsion-sized particles retains much of the size uniformity of the original, emulsion particles, and is capable of increasing the size of the original, emulsion-polymerized polymer by a factor of at least 10 and as much as 1000. A small amount of very small emulsion particles may be observed in the product of these processes, but such particles account for much less than 1.0% of the total particle weight, and do not adversely affect the optical properties of the light-scattering polymer. Related techniques for preparing uniformly sized particles in the desired size range are taught by Ugelstad, U.S. Pat. No. 4,186,120.

The finished core/shell polymer may be isolated from the emulsion in which it is prepared using conventional techniques such as spray-drying, coagulation and the like. They may also be mixed with the matrix polymer by co-isolation in a devolatilizing extruder, as taught by Bortnick in U.S. Pat. No. 3,751,527.

The matrix polymers useful in the present invention are preferably clear thermoplastic polymers that do not crystallize under processing or use conditions, i.e., that have a glass-transition temperature higher than about 50° C., and thus are amorphous following incorporation of the particulate polymer composition of the present invention, and that remain amorphous following processing to form the light-scattering composition of the present invention or light-scattering articles made from the sheet. These matrix polymers typically have an elastic modulus of about 1400 to about 3500 megapascals (MPa), and may be formed into shaped articles by molding, casting, extrusion or other processes apparent to those skilled in the art. Examples of such matrix polymers include homopolymers of methyl methacrylate, styrene, vinyl chloride and the like, imidized polymers of methyl methacrylate known as polyglutarimides, and copolymers of methyl methacrylate with alkyl acrylates, styrene with up to 40% acrylonitrile, styrene with methyl methacrylate, alpha-methylstyrene with methyl methacrylate and alkyl acrylates, vinyl chloride with vinyl acetate or propylene, the alkyl group of the alkyl acrylates containing 1 to 8 carbon atoms. Also suitable are homopolymers and copolymers of cellulose acetate butyrate and certain amorphous condensation polymers such as poly(ethylene terephthalate) and poly(cyclohexanedimethanol terephthalate). Preferred matrix polymers are copolymers of methyl methacrylate with from about 1 to about 15% alkyl acrylates wherein the alkyl contains from 1 to 8 carbon atoms.

Softer matrix polymers, including polymers capable of plasticization, may also be used, such as poly(vinyl acetate), plasticized vinyl chloride homo-and copolymers, plasticized cellulosic esters and the like.

Another preferred class of matrix polymers useful in the present invention are thermoset polymers. The polymers may be thermoset as prepared, such as in casting of a sheet of poly(methyl methacrylate) containing sufficient polyfunctional monomer to immobilize and insolubilize the resulting sheet, or the polymer may be thermoset after polymerization is completed, such as by activating a cure reaction by heating of the polymerized sheet. Examples of such thermosettable matrix polymers include homopolymers of methyl methacrylate, styrene, vinyl chloride and the like, imidized polymers of methyl methacrylate known as polyglutarimides, and copolymers of methyl methacrylate with alkyl acrylates, styrene with up to 40% acrylonitrile, styrene with methyl methacrylate, alpha-methylstyrene with methyl methacrylate and alkyl acrylates and vinyl chloride with vinyl acetate or propylene. Compatible or refractive-index matched blends of the matrix polymers may be used. Preferred matrix polymers are copolymers of methyl methacrylate with from about 1 to about 15% alkyl acrylates wherein the alkyl contains from 1 to 8 carbon atoms and which also contain a polyfunctional dimethacrylate monomer at the 0.05 to 2% level, or which contain acrylamide and N-methylolacrylamide at the 0.05 to about 5% level.

The thermoset polymers need not be formed from vinyl monomers, but may be prepared by condensation or ring-opening polymerization, such as by polyesterification in the presence of multifunctional glycols or by epoxide polymerization in the presence of trifunctional epoxides.

The single-phase polymer and core/shell polymer are incorporated into the matrix polymers preferably by melt blending, although other techniques known to those skilled in the art may be employed. For instance, they may be introduced dry into the monomers of the matrix polymer prior to their polymerization. Other conventional additives, such as ultraviolet-light stabilizers, soluble flame retardants, dyes, thermal stabilizers, and the like may also be present in the blend of core/shell or single-phase polymer with matrix polymer.

The level of single-phase polymer and core/shell polymer present in the matrix polymer will depend upon the optical effect desired, the thickness of the final fabricated article, the core/shell particle size and the difference in refractive index between the particle (or core if core/shell) and the matrix polymer. A practical useful range for the single-phase polymer and/or core/shell polymer is from about 0.1 to about 40%, preferably to about 30%, more preferably to about 20% and even more preferably to about 10% of the total polymer weight.

The lens materials used in this invention can be applied to a substrate in a variety of ways. For example, in polymeric substrates, if the substrate has a lower softening point than that of the lens components, the substrate can be heated to its softening point and the dry lens materials sprayed onto the softened substrate, which is then allowed to cool whereby the lens particles stick to the substrate.

Alternatively, as described in several examples below, the beads can be formulated with binders to create an aqueous coating composition that can be applied (e.g., by spray or roller coating, jetting or printing) onto an appropriate substrate. The most efficient geometric arrangement of the convergent and divergent lens particles in their respective layers is in a single layer of spheres on the substrate, preferably where the particles are in a hexagonal close packing arrangement as much as possible.

When aqueous based, in addition to the binders described in the Examples below, other suitable binders include such coating agents as amino silane, epoxy, epoxy silane, alkyl silane, fatty acid or silicon oil. Preferred amino silane is aminoethylaminopropyltrimethoxysilane and cellulose acrylate solution. Other suitable aqueous binders include (co) polymers chosen from acrylic, vinyl, such as vinyl acetate or vinyl acetate-ethylene, polyurethanes, siloxanes, natural rubbers, synthetic rubber polymers, such as styrene-butadiene (SBR) block copolymers, protein polymers, cellulosic polymers and mixtures and combinations thereof, for example, acrylic urethanes.

In the case where the lens compositions are solvent-stable, the compositions can be applied by solvent casting the composition. The solvents used in solvent casting include methyl ethyl ketone, methyl isobutyl ketone, ethyl acetate, butyl acetate, toluene, isopropanol, ethyl alcohol and xylene.

The test films described below made with the coating compositions are of the following dimension: surface area 77 mm×56 mm and thicknesses that vary from: 0.205 mm to 0.210 mm. These samples were evaluated by ASTM E 167-96 (Standard practice for Goniophotometry of objects and materials), ASTM D 10003-00 (Standard test method for haze and luminous transmittance of transparent plastics) and ASTM E 313-00 (Standard practice for calculating yellowness and whiteness indices from instrumentally measured color coordinates).

The light diffusing devices described below were evaluated for diffuse light transmission (Tt), yellowness index (YI) and diffusivity.

Tt was measured in accordance with ASTM D 10003-00.

Yellowness index values were determined by ASTM E 313-00.

Diffusivity was measured in accordance with ASTM E 167-96.

The particle sizes referenced in the examples below are number average particle sizes.

EXAMPLE 1

Pre-Seed Polymer

This example illustrates the preparation of crosslinked polymer pre-seeds of 0.25 μm in diameter for making large seed particles in aqueous dispersion. The following mixtures A-C were prepared with deionized water:

| Mixture | Component | Parts by Weight |
|---|---|---|
| A1 | Water | 180 |
|  | Sodium Carbonate | 0.40 |
| B1 | n-Butyl Acrylate | 98.0 |
|  | Allyl Methacrylate | 1.75 |
|  | 1,4-Butanediol Diacrylate | 0.25 |
|  | 22.5% aqueous Sodium Dodecylbenzenesulfonate | 2.22 |
|  | Water | 40.8 |
| C1 | Sodium Persulfate | 0.06 |
|  | Water | 11.9 |

A reactor equipped with stirrer and condenser and blanked with nitrogen was charged with Mixture A1 and heated to 83° C. To the reactor contents was added 10% of emulsified Mixture B1 and 25% of Mixture C1. The temperature was maintained at 83° C. and the mixture was stirred for 60 minutes, after which the remaining Mixture B1 and Mixture C1 were added to the reactor with stirring over a period of 120 minutes. Stirring was continued at 83° C. for 90 minutes, after which the reactor contents were cooled to room temperature. The particle size of the resulting particle pre-seeds was 0.25 μm as measured by a Brookhaven Instruments particle size analyzer BI-90.

EXAMPLE 2

Polymer Seeds

In this example the pre-seed particles in the emulsion of Example 1 are grown to 0.56 μm diameter using n-butyl acrylate, styrene, and 1-hexanethiol. The following mixtures A2-G2 were prepared with deionized water:

| Mixture | Component | Parts by Weight |
|---|---|---|
| A2 | Sodium Carbonate | 0.08 |
|  | 9.76% aqueous Sodium Dodecylbenzenesulfonate | 0.01 |
|  | Water | 156.00 |
| B2 | 30.10% aqueous emulsion from Example 1 | 29.80 |

-continued

| Mixture | Component | Parts by Weight |
|---|---|---|
| C2 | n-Butyl Acrylate | 81.80 |
| | Styrene | 18.20 |
| | 9.76% aqueous Sodium Dodecylbenzenesulfonate | 4.53 |
| | Water | 57.50 |
| D2 | 1-Hexanethiol | 18.80 |
| | 9.76% aqueous Sodium Dodecylbenzenesulfonate | 0.58 |
| | Water | 15.00 |
| E2 | Sodium Persulfate | 0.11 |
| | Water | 47.40 |
| F2 | t-Butyl Hydroperoxide 70% | 0.30 |
| | Water | 15.00 |
| G2 | Sodium Formaldehyde Sulfoxylate | 0.20 |
| | Water | 6.67 |

Mixture A2 was added to the reactor of Example 1 and heated to 88° C. with stirring. The air in the reactor was replaced by nitrogen. When the reactor temperature stabilized at 88° C., Mixture B2 was charged into the reactor. Emulsified Mixtures C2 and D2, and Mixture E2 were then added to the reactor, with stirring, over a period of 300 minutes. Stirring was continued at 88° C. for 90 minutes. The reactor contents were cooled to 65° C. Mixtures F2 and G2 were added and the reactor contents were maintained at 65° C. with stirring for 1 hour, after which the reactor contents were cooled to room temperature. The resulting emulsion particles had a diameter of 0.56 µm as measured by a Brookhaven Instruments particle size analyzer BI-90.

EXAMPLE 3

Divergent Lens Composition

In this example, the particles in the emulsion of Example 2 are expanded to create 5 µm diameter divergent lenses using n-butyl acrylate and ally methacrylate in Stage I which is then followed by Stage II copolymerization of methyl methacrylate and ethyl acrylate. The following mixtures A3-G3 were prepared with deionized water:

| Mixture | Component | Parts by Weight |
|---|---|---|
| | Stage I | |
| A3 | Water | 138.50 |
| B3 | | |
| | Aqueous emulsion from Example 2 at 29.88% solids | 0.105 |
| C3 | n-Butyl Acrylate | 76.80 |
| | Allyl Methacrylate | 3.20 |
| | 10% aqueous Sodium Dodecylbenzenesulfonate | 0.28 |
| | Water | 33.12 |
| D3 | t-Butyl Peroctoate | 0.427 |
| | 10% aqueous Sodium Dodecylbenzenesulfonate | 0.003 |
| | Water | 2.96 |
| | Stage II | |
| E3 | Methyl Methacrylate | 19.20 |
| | Ethyl Acrylate | 0.80 |
| F3 | Sodium Formaldehyde Sulfoxylate | 0.062 |
| | Water | 6.67 |
| | 10% aqueous Sodium Dodecylbenzenesulfonate | 0.017 |
| G3 | t-Butyl Hydroperoxide 70% | 0.089 |
| | Water | 10.05 |
| | 10% aqueous Sodium Dodecylbenzenesulfonate | 0.037 |

To the reactor of Example 1 was added A3 which was heated to 90° C. with stirring. The air in the reactor was replaced by nitrogen. When the reactor temperature stabilized at 90° C., Mixture B3 was charged into the reactor. Mixture C3 was emulsified with a homogenizer and charged into the reactor. The reactor was stirred at 60° C. for 1 hour. Mixture D3 was emulsified with a homogenizer and charged into the reactor. After 1 hour agitation at 60° C., the reactor was gradually heated to 65-70° C. while an exothermic polymerization takes place. After reach peak temperature, agitation was continued while the reactor was cooled to 73° C. in 30 minutes. Charge half of Mixture F3. Mixtures E3, the remainder of F3, and G3 were then separately added into the reactor over a period of 2 hours. The temperature was maintained between 73-75° C. and stirring was continued for 1 hour before the reactor was cooled to room temperature. The resulting emulsion particles, 9A, TABLE I, had a diameter of 5 µm as measured by a Coulter Corporation Multisizer IIE particle size analyzer.

EXAMPLE 4

Convergent Lens Composition

In this example the particles in the emulsion of Example 2 are expanded to create a dispersion of 5 µm diameter convergent lenses using benzyl acrylate and allyl methacrylate in Stage I which is then followed by Stage II copolymerization of methyl methacrylate and ethyl acrylate. The following mixtures A4-K4 were prepared with deionized water:

| Mixture | Component | Weight % on Monomer |
|---|---|---|
| | Stage I | |
| A4 | Water | 253.06 |
| B4 | Aqueous emulsion from Example 2 at 29.1% solids | 0.31 |
| | Water | 0.44 |
| C4 | Benzyl Acrylate | 76.80 |
| | Allyl Methacrylate | 3.20 |
| | 23% aqueous Sodium Dodecylbenzenesulfonate | 1.25 |
| | Water | 39.6 |
| D4 | t-Butyl Peroctoate | 0.56 |
| | 23% aqueous Sodium Dodecylbenzenesulfonate | 0.16 |
| | Water | 2.47 |
| | Stage II | |
| E4 | Methyl Methacrylate | 19.20 |
| | Ethyl Acrylate | 0.80 |
| | 23% aqueous Sodium Dodecylbenzenesulfonate | 0.25 |
| | Water | 10.50 |
| F4 | Sodium Formaldehyde Sulfoxylate | 0.03 |
| | Water | 2.35 |
| G4 | t-Butyl Hydroperoxide 70% | 0.09 |
| | Water | 2.18 |
| H4 | Sodium Formaldehyde Sulfoxylate | 0.03 |
| | Water | 2.18 |
| I4 | Aqueous Ferrous Sulfate 0.15% | 0.55 |
| | Water | 0.28 |
| J4 | t-Butyl Hydroperoxide 70% | 0.23 |
| | Water | 1.66 |
| K4 | Sodium Formaldehyde Sulfoxylate | 0.18 |
| | Water | 1.70 |

To the reactor of Example 1 was added A4 which was heated to 90° C. with stirring. The air in the reactor was replaced by nitrogen. When the reactor temperature stabilized at 90° C., Mixture B4 was charged into the reactor over 1 hour. Mixture C4 was emulsified with a homogenizer and charged into the reactor. The reactor was stirred at 64° C. for 1 hour. Mixture D4 was emulsified with a homogenizer and charged into the reactor, after which an exothermic polymerization took place. After reaching peak temperature, agitation was continued while the reactor was cooled to 75° C. Mixture F was charged to the reactor. Mixtures E4, G4, and H4 were then separately added over a 1.8-hour period. During this addition the temperature was maintained between 73-77° C. and stirring was continued. Mixture I4 was then charged to the reactor, followed by addition of Mixtures J4 and K4 over 30 minutes. The resulting emulsion was filtered and a particle size of 4.8 μm was determined by a Coulter Corporation Multisizer IIE particle size analyzer.

EXAMPLE 5

Two-Stage, Toughened Elastomeric Binder

The following mixtures were prepared:

| Mixture | Component | Parts by Weight |
|---|---|---|
| A5 | Water | 238.58 |
|  | 28% aqueous sodium lauryl sulfate | 28.99 |
|  | 30% aqueous secondary alcohol ethoxylate (15.4 HLB) | 108.21 |
|  | Ethyl Acrylate | 783.18 |
|  | Acrylic Acid | 28.41 |
| B5 | 0.15% ferrous sulfate heptahydrate | 4.08 |
| C5 | Water | 25.49 |
|  | Ammonium persulfate | 0.81 |
| D5 | Water | 25.49 |
|  | Sodium hydrosulfite | 1.43 |
|  | Ammonium hydroxide | 0.41 |
| E5 | Water | 20 |
|  | t-Butyl hydroperoxide | 0.46 |
| F5 | Water | 20 |
|  | Disodium salts of 2-hydroxy-2-sufinatoacetic acid and 2-hydroxy-sufonatoacetic acid, sodium sufite. | 0.47 |
| G5 | Methyl methacrylate | 202.90 |
| H5 | Water | 9.18 |
|  | t-Butyl hydroperoxide | 0.92 |
| I5 | Water | 38.74 |
|  | Disodium salts of 2-hydroxy-2-sufinatoacetic acid and 2-hydroxy-sufonatoacetic acid, sodium sufite. | 0.9 |
| J5 | Water | 35.69 |
|  | t-Butyl hydroperoxide | 1.53 |
| K5 | Water | 35.69 |
|  | Disodium salts of 2-hydroxy-2-sufinatoacetic acid and 2-hydroxy-sufonatoacetic acid, sodium sufite. | 1.33 |
| L5 | Triethylamine | 17.84 |
|  | Water | 50.98 |

A reactor equipped with a stirrer and condenser is charged with 1259.19 g of deionized water. Nitrogen is allowed to bubble through the water for 20 minutes. The reactor is then blanketed with nitrogen and charged with mixture A5. With the reactor mixture temperature below 20° c, mixtures B5, C5 and D5 are rapidly and successively added to the reactor. Within around 10 minutes, the temperature increases and peaks at around 85° c. Approximately ten minutes after the peak temperature, mixture E5 followed by mixture F5 are added. After a 5 minute hold, the reactor mixture is cooled to 75° c. Mixture g5 is added to the reactor followed by mixtures H5 and I5. Within 5 minutes an exotherm of 5-10° c is observed. After a 15 minute hold, mixtures J5 and K5 are separately metered into the reactor over 30 minutes while the batch is cooled. Mixture L5 is added, and the polymer sample is then filtered through a 100 mesh screen to remove coagulum.

EXAMPLE 6

Divergent Lens Coating Formulation

| Formulation #1 | Amounts | Solid amount | Bead/binder solid/solid ratio |
|---|---|---|---|
| Water | 156 |  |  |
| Emulsion from example 3 | 258 | 87.7 | 80 |
| Emulsion from example 5 | 63 | 22.1 | 20 |
| Polyether modified polysiloxane | 5 | 5 |  |
| HEUR Rheology Modifier | 18 | 4.5 |  |

Components of Formulation #1 were stirred for at 20 minutes using a standard bench top mixer. The Brookfield viscosity of Formulation#1 (1.25 sec-1) was 400 cPs

EXAMPLE 7

Divergent Lens Coating

| Formulation #2 | Amounts | Solid amount | Bead/binder solid/solid ratio |
|---|---|---|---|
| Water | 48.4 |  |  |
| Emulsion from example 3 | 112 | 36.5 | 80 |
| Emulsion from example 5 | 26 | 9.1 | 20 |
| Polyether modified polysiloxane | 3.1 | 3.1 |  |
| HEUR Rheology Modifier | 10.4 | 2.6 |  |

Components of Formulation #2 were stirred for at 20 minutes using a standard bench top mixer. The Brookfield viscosity of Formulation#1 (1.25 sec-1) was 900 cPs Prior to spraying Formulation #2 was diluted by adding 100 grams of water to 150 grams of Formulation #2.

EXAMPLE 8

Convergent Lens Formulation

| Formulation #3 | Amounts | Solid amount | Bead/binder solid/solid ratio |
|---|---|---|---|
| Water | 0 |  |  |
| Emulsion from example 4 | 164.4 | 36.5 | 80 |
| Emulsion from example 5 | 26 | 9.1 | 20 |

-continued

| Formulation #3 | Amounts | Solid amount | Bead/binder solid/solid ratio |
|---|---|---|---|
| Polyether modified polysiloxane | 3.1 | 3.1 | |
| HEUR Rheology Modifier | 10.4 | 2.6 | |

Components of Formulation #3 were stirred for at 20 minutes using a standard bench top mixer. Brookfield viscosity of Formulation#1 (1.25 sec-1): 700 cPs Prior to spraying Formulation#3 was diluted by adding 100 grams of water to 150 grams of Formulation #3. Spraying of all formulation was completed using a conventional spray gun using air pressure.

Dried films were measured optically by evaluation of light diffusivity by a goniophotometer and optical properties by colorimeter. The former instrument measures the output intensity of visible light transmitted through the plaque at angles varying from: −90° to +90°.

EXAMPLE 9

Diffusing Device

Formulation 2 as described in example 7 was sprayed onto one face of a 0.3 m×0.3 m piece of Mylar® PET sheet (7 mils thick). Prior to spraying, weight of the Mylar® sheet was determined, and after spraying the wet formulation and subsequently drying at 82° C. for 5 minutes the sheet was re-weighed to determine the amount of dry "add-on". After drying, the opposite face of the Mylar® sheet was sprayed with formulation #3 as described in example 8.

Optical measurements from "double-sided" samples prepared from examples 7 and 8

| Spray add-on (g/m2) | Haze (%) | Tt (%) | YI | Diff. (%) |
|---|---|---|---|---|
| Side 1 Formulation #2 10.4 g/side #2 formulation #3 7.9 g | 83.16 | 83.34 | 3.35 | 10.77 |

EXAMPLE 10

Diffusing Device

Formulation 2 as described in example 7 was sprayed onto one face of a 0.3 m×0.3 m piece of Mylar® PET sheet (7 mils thick). Prior to spraying, weight of the Mylar® sheet was determined and after spraying the wet formulation and subsequently drying at 82° C. for 5 minutes the sheet was re-weighed to determine the amount of dry "add-on". After drying the sheet, formulation #3 was then sprayed directly on top of the dried formulation 2 (both formulations were sprayed on the same face of the Mylar® sheet as separate layers).

Optical measurements from "double layer" diffuser prepared in Example 10

| Spray add-on (g/m2) | Haze (%) | Tt (%) | YI | Diff. (%) |
|---|---|---|---|---|
| Formulation #2 6.8 g (directly sprayed on Mylar ® sheet | 78.31 | 102.58 | 3.03 | 5.44 |
| Formulation #3 8.3 g (directly sprayed over dried formulation #2) | | | | |

EXAMPLE 11

Formulation 2 as described in Example 7 was sprayed out onto one face of a 0.3 m×0.3 m piece of Mylar® PET sheet. Prior to spraying, weight of the Mylar® sheet was determined; and the weight was determined again after spraying the wet formulation; and subsequently after drying at 82° C. for 5 minutes, the sheet was re-weighed to determine the amount of dry "add-on". After drying the opposite face of the Mylar® sheet was sprayed with Formulation 3 as described in Example 8.

Optical measurements from "double-sided" samples prepared from Examples 7 and 8

| Spray add-on | Haze (%) | Tt (%) | YI | Diff. (%) |
|---|---|---|---|---|
| Side 1 Formulation #2 0.97 g | 83.16 | 83.34 | 3.35 | 10.77 |
| Side 2 Formulation #3 0.73 g | | | | |

We claim:

1. A light diffusing article, comprising:
  (a) an organic or inorganic polymeric sheet-like substrate that is optically clear with a refractive index of from 1.4 to 1.8; and
  (b) one or more layer of one or more coating composition on at least one surface of the substrate, wherein a given layer of coating composition comprises solid, clear polymeric lenses, wherein the polymeric lenses in a given layer of coating composition are either:
    (i) divergent lenses having a focal length of −0.5 µm to −15 µm, and a continuous refractive index gradient such that the refractive index at the centers of the lenses is lower than the refractive index at the surface of the lenses; or
    (ii) convergent lenses having a focal length of from 2.5 µm to 74 µm and a continuous refractive index gradient such that the refractive index at the centers of the lenses is greater than the refractive index at the surface of the lenses;
  wherein each layer has a thickness of less than 375 µm, and wherein the polymeric lenses have a diameter of 0.85 to 30 µm.

2. The light diffusing article of claim 1 wherein the polymeric lenses in a given layer of coating composition have a polydispersity from 1 to 1.5.

3. The light diffusing article of claim 1 comprising two or more layers of coating compositions, wherein one or more layers of the coating composition are formed from divergent lenses, and one or more layers of the coating composition are formed from convergent lenses.

4. The light diffusing article of claim 3 wherein the two or more layers of coating composition are on the same surface of the substrate.

5. The light diffusing article of claim 3 wherein the two or more layers of coating composition are on opposing surfaces of the substrate.

6. The light diffusing article of claim 5 wherein the one or more layer of the coating composition formed from divergent lenses are on one surface of the substrate, and the one or more layer of coating composition formed from convergent lenses are on the opposing surface of the substrate.

7. The light diffusing article of claim 6 wherein the divergent lenses in any given layer of the one or more layer of coating composition formed from divergent lenses have essentially the same continuous refractive index gradient, and the convergent lenses in any given layer of the one or more layer of coating composition formed from convergent lenses have essentially the same continuous refractive index gradient.

8. The light diffusing article of claim 1 further comprising one or more layer of coating composition comprising solid, clear polymeric beads, the beads have a center and a surface, wherein the beads have a refractive index at the center which is essentially the same as the refractive index at the surface.

9. The light diffusing article of claim 1 wherein at least one of the one or more layers is applied in an aqueous polymeric dispersion to the substrate.

10. The light diffusing article of claim 1 wherein the aqueous polymeric dispersion further includes a latex polymeric binder.

11. The light diffusing article of claim 1 wherein one or more of the one or more layers contain a monolayer of polymeric particles.

12. The light diffusing article of claim 1 wherein the substrate has a haze lower than 10% and luminous transmittance greater than 90%.

13. The light diffusing article of claim 1 wherein the one or more layers each have thicknesses in the range from 6 μm to 150 μm.

14. The light diffusing article of claim 1 wherein the polymeric lenses are formed by a two stage process involving a first stage to form an inner portion of the polymeric lenses and a second stage to form an outer portion of the polymeric lenses, and wherein crosslinker is used in the second stage that forms the outer portion of the polymeric lenses.

15. The light diffusing article of claim 1 wherein the article comprises one or more layer of the coating composition on one or more layers of substrate, in which at least one of the one or more layer of coating composition comprises a blend of divergent lenses and convergent lenses.

16. The light diffusing article of claim 1 comprising one or more layer of substrate, may also be formed such that one or more portions of a given layer of substrate is coated with coating composition comprising divergent lenses or convergent lenses or a blend of divergent and convergent lenses while one or more other portions of the same given layer of substrate is uncoated, or coated with coating composition comprising divergent lenses, convergent lenses, or a blend of divergent and convergent lenses with different index of refraction or optical properties than the lenses in one or more other portions of the given layer of substrate.

17. A light diffusing article, comprising:
(a) an organic or inorganic polymeric sheet-like substrate that is optically clear with a refractive index of from 1.4 to 1.8;
(b) at least one first layer of a first coating composition on at least one surface of the substrate with the first coating composition comprises solid clear first polymeric divergent lenses from 1-30 μm in diameter, a focal length of −0.5 μm to −15 μm, and a continuous refractive index gradient such that the refractive index at the centers of the first lenses is lower than the refractive index at the surface of the first lenses and wherein the first layer is less than 375 μm thick; and
(c) at least one second layer of a second coating composition on at least one surface of the substrate with the second coating composition comprises solid clear second polymeric convergent lenses from 1-30 μm in diameter, a focal length of from 2.5 μm to 74 μm and a continuous refractive index gradient such that the refractive index at the centers of the second lenses is equal to or higher than the refractive index at the surface of the second lenses and wherein the second layer is less than 375 μm thick.

* * * * *